(12) United States Patent
Moutier et al.

(10) Patent No.: US 8,636,107 B2
(45) Date of Patent: Jan. 28, 2014

(54) METHOD FOR REPAIRING AT LEAST A PORTION OF AN ACOUSTIC PANEL

(71) Applicant: Aircelle, Gonfreville l'Orcher (FR)

(72) Inventors: John Moutier, Le Havre (FR); Emmanuel Anfray, Saint Martin du Manoir (FR); Franck Maze, Le Havre (FR); Herve Simon, Sandouville (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/941,044

(22) Filed: Jul. 12, 2013

(65) Prior Publication Data

US 2013/0292202 A1   Nov. 7, 2013

Related U.S. Application Data

(63) Continuation of application No. PCT/FR2012/050061, filed on Jan. 10, 2012.

(30) Foreign Application Priority Data

Jan. 13, 2011   (FR) ...................................... 11 50284

(51) Int. Cl.
*E04B 1/84*   (2006.01)
*B32B 43/00*  (2006.01)
*E04B 1/74*   (2006.01)

(52) U.S. Cl.
USPC ..... 181/292; 181/288; 29/402.09; 29/402.11; 29/897.1; 156/94; 156/98; 156/268

(58) Field of Classification Search
USPC .......... 181/292, 288, 213; 29/402.09, 402.11, 29/897.1; 156/94, 98, 252, 268; 428/117, 428/116, 137, 593, 73; 244/53 B
See application file for complete search history.

(56) References Cited

U.S. PATENT DOCUMENTS

| 4,257,998 | A | * | 3/1981 | Diepenbrock et al. | ........ 264/156 |
| 4,517,038 | A | * | 5/1985 | Miller | ............... 156/98 |
| 4,668,317 | A | * | 5/1987 | Snyder | ............... 156/98 |
| 4,855,182 | A | * | 8/1989 | Ondrejas et al. | .............. 428/343 |
| 5,041,323 | A | * | 8/1991 | Rose et al. | ..................... 428/116 |
| 5,315,820 | A | * | 5/1994 | Arnold | ........................ 60/226.1 |
| 5,807,628 | A | * | 9/1998 | Mnich et al. | ................. 428/314.2 |
| 5,958,166 | A | * | 9/1999 | Walters et al. | ................... 156/94 |

(Continued)

FOREIGN PATENT DOCUMENTS

| EP | 1870228 A1 | 12/2007 |
| EP | 1985538 A2 | 10/2008 |
| EP | 2108504 A1 | 10/2009 |

*Primary Examiner* — Edgardo San Martin
(74) *Attorney, Agent, or Firm* — Brinks Gilson & Lione

(57) ABSTRACT

The present disclosure relates to a method for repairing a portion of an acoustic panel for a nacelle of an aircraft turbojet engine. The panel includes an acoustic skin in which a plurality of acoustic holes are drilled, a solid skin, and a cellular acoustic structure. The cellular acoustic structure, being arranged between the acoustic skin and the solid skin, has a plurality of cells, each of which has one or more drainage openings arranged in one or more of the walls forming each cell. The method includes a step of: defining a part of the acoustic panel to be cut; forming a cutting area closed by the acoustic skin; injecting a resin through the acoustic holes; positioning a replacement cellular acoustic structure in the cutting area and on the acoustic skin; forming a solid replacement skin on the replacement cellular acoustic structure.

10 Claims, 3 Drawing Sheets

(56) References Cited

U.S. PATENT DOCUMENTS

| | | | |
|---|---|---|---|
| 6,173,807 B1* | 1/2001 | Welch et al. | 181/213 |
| 6,656,299 B1* | 12/2003 | Grosskrueger et al. | 156/98 |
| 7,069,830 B1* | 7/2006 | Meyer | 83/13 |
| 7,572,347 B2* | 8/2009 | Bogue | 156/98 |
| 7,875,141 B2* | 1/2011 | Bogue et al. | 156/98 |
| 7,883,760 B2* | 2/2011 | Bogue | 428/116 |
| 7,935,205 B2* | 5/2011 | Bogue et al. | 156/98 |
| 7,981,519 B2* | 7/2011 | Holland et al. | 428/593 |
| 8,108,979 B2* | 2/2012 | Stadtlander et al. | 29/402.09 |
| 8,469,146 B2* | 6/2013 | Bornert-Dano | 181/292 |
| 2007/0275211 A1* | 11/2007 | Bogue | 428/116 |
| 2007/0275212 A1* | 11/2007 | Stadtlander et al. | 428/116 |
| 2007/0289692 A1* | 12/2007 | Bogue et al. | 156/98 |
| 2008/0233346 A1* | 9/2008 | Bogue et al. | 428/116 |
| 2011/0177285 A1* | 7/2011 | Bogue et al. | 428/117 |

* cited by examiner

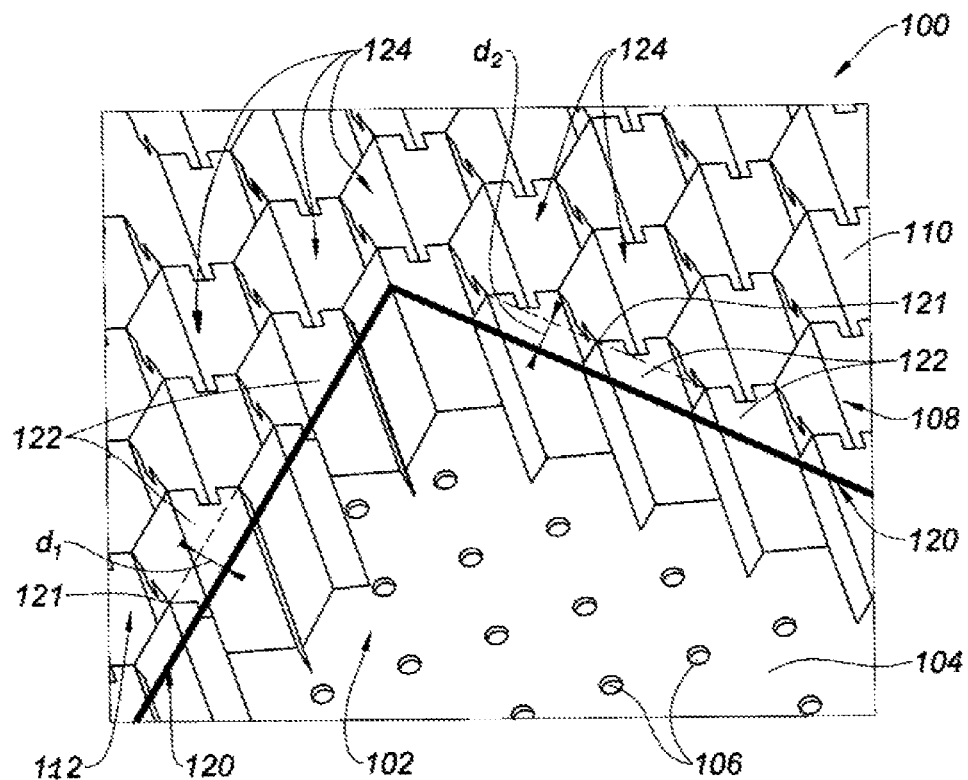
Fig. 3
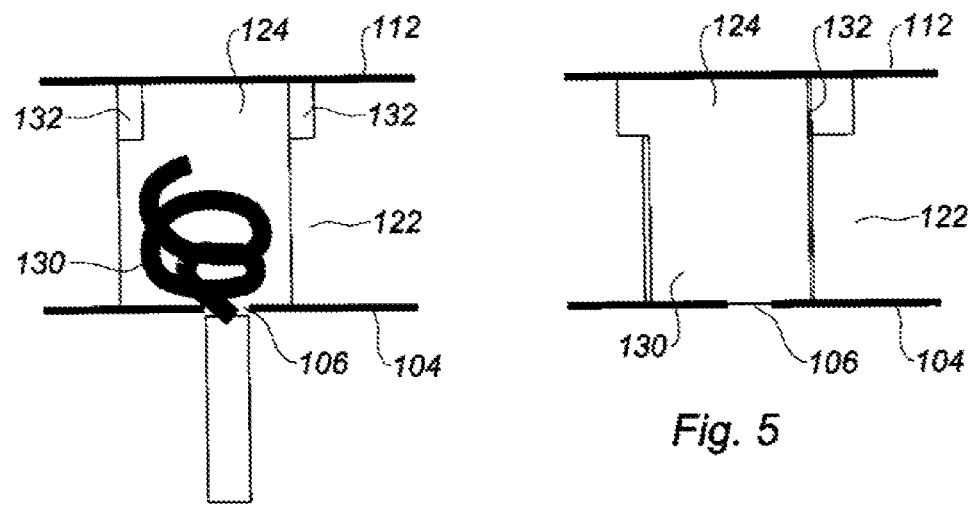
Fig. 4
Fig. 5

METHOD FOR REPAIRING AT LEAST A PORTION OF AN ACOUSTIC PANEL

CROSS-REFERENCE TO RELATED APPLICATIONS

This application claims the benefit of International Application No. PCT/FR2012/050061, filed on Jan. 10, 2012, which claims the benefit of FR 11/50284, filed on Jan. 13, 2011. The disclosures of the above applications are incorporated herein by reference.

FIELD

The present disclosure relates to a method for repairing a part of an acoustic panel for a nacelle of an aircraft turbojet engine.

BACKGROUND

The statements in this section merely provide background information related to the present disclosure and may not constitute prior art.

Aircraft turbojet engines generate significant noise pollution. There is a strong demand to reduce the pollution, particularly given that the turbojet engines used are becoming increasingly powerful. The design of the nacelle surrounding a turbojet engine contributes in large part to reducing noise pollution.

In order to further improve the acoustic performance of aircrafts, the cells are equipped with acoustic panels that attenuate the noises due to the circulation of flows of air through the turbojet engine as well as the vibrations of the structures of the nacelle.

Acoustic panels are sandwich-type structures well known for absorbing these noises. These panels typically include a cellular acoustic structure that may assume the form of one or more superimposed cellular layers and each comprising cells (commonly called a "honeycomb" structure). The cellular acoustic structure is generally covered on the so-called outer face, i.e., the face radially furthest from the axis of the engine, by a skin that is impermeable to air, called "solid," and on the inner face, i.e., the face radially closest to the axis of the engine, with an air-permeable perforated skin, called "acoustic."

The acoustic skin is then assembled by positioning, then gluing the different skins and the acoustic structure on a mold having the required shape. The assembly undergoes curing in an autoclave so as to tighten the layers and polymerize the parts.

Such panels constitute acoustic resonators capable of "trapping" the noise and therefore attenuating the sound emissions toward the outside of the nacelle.

However, such acoustic panels may be damaged during the operation of the nacelle, requiring the repair or replacement of one or all of said panels.

Typically, the visible and accessible parts of the area of the acoustic panel to be repaired are cleaned before performing any repair. In fact, pollutant particles from the environment of the turbojet engine become deposited on said visible and accessible parts during the operation of the turbojet engine. The presence of such particles is detrimental for the durability of the future repaired panel.

However, it is not possible to eliminate all of the pollutant particles trapped in the cells. It is thus necessary for the repair technician to perform the repair without transferring any pollutant particles that may be present to the repair area.

SUMMARY

The present disclosure provides a repair method meeting this need that is effective and easy to implement.

To that end, according to a first aspect, the present disclosure relates to a method for repairing at least a portion of an acoustic panel for a nacelle of an aircraft turbojet engine, said panel comprising an acoustic skin in which a plurality of acoustic holes are drilled, a solid skin, and a cellular acoustic structure comprising a plurality of cells, each of which has one or more drainage openings arranged in one or more of the walls forming each cell, said structure being arranged between the acoustic skin and the solid skin, said method comprising, in particular, a step in which:

A—a part of the acoustic panel to be cut is defined;
B—said part is cut with the exception of the acoustic panel;
C—the cut part is removed, thereby forming a cut in the cut acoustic panel forming a cutting area that is closed by the acoustic skin;
D—a resin, which is capable of hardening at ambient temperature, is injected through the acoustic holes of the acoustic skin, said holes terminating in complete cells adjacent to junction cells belonging to the cut acoustic panel so as to block the drainage openings of said junction cells, said junction cells being intended to be in contact with the cutting area;
E—a replacement cellular acoustic structure is positioned in the cutting area and on the acoustic skin, said acoustic replacement structure having a size substantially equal to the cutting area; and
F—a solid replacement skin is formed on the replacement cellular acoustic structure.

"Ambient temperature" here refers to the temperature of the repair location where the acoustic panel to be repaired is placed.

The method according to the present disclosure advantageously makes it possible to block the circulation of air during the repair of the acoustic panel between the repair area and the periphery thereof. The method according to the present disclosure therefore simply and effectively makes it possible to prevent bringing pollutant particles into the area of the acoustic panel to be repaired, which ensures good cohesion of the future repaired panel.

Furthermore, the method according to the present disclosure advantageously does not increase the mass of the acoustic panel thus repaired.

The method according to the present disclosure does not substantially harm the acoustic properties of said acoustic panel. In fact, the number of obstructed cells is negligible with respect to the total number of cells.

According to other features of the present disclosure, the method includes one or more of the following optional features, considered alone or according to any technically possible combination(s):

in step D, the resin used is chosen from among materials making up the acoustic panel or thermoplastic materials;

wherein, in step D, the resin is injected using an injection means, in particular a pneumatic pistol or a syringe, which allows a simple and reliable injection;

wherein during step B, the part is cut such that the cutting area is defined by a cutting line positioned at a distance comprised between 2 mm and 3 mm from the apices of each junction cell closest to the cutting line, which allows a regular cutting line and thus a controlled injection of the resin for the user;

the method comprises an additional step G at the end of step F wherein the adjacent complete cells obstructed by the resin are unblocked, which makes it possible to optimize the sound absorption of the acoustic panel;

during step G, said cells are unblocked using heating, then a release means, which makes it possible to unblock the adjacent complete cells simply and reliably;

during step F, the solid replacement skin is formed by applying pre-impregnated fabrics, which makes it possible to obtain a solid replacement skin simply and reliably;

the cellular acoustic structure includes one or more substantially superimposed cellular layers that may or may not be separated by a septum, which makes it possible to improve the sound absorption of the acoustic panel.

According to another aspect, the present disclosure relates to an acoustic panel prepared using the repair method according to the present disclosure.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIG. 3 is an enlarged perspective view of area III of FIG. 2;

FIG. 4 is a diagrammatic transverse cross-section of an adjacent solid cell during the injection of resin according to one form of the present disclosure;

FIG. 5 is a diagrammatic transverse cross-section of an adjacent solid cell after the injection of resin according to the form of the method of FIG. 4.

Figure 1:
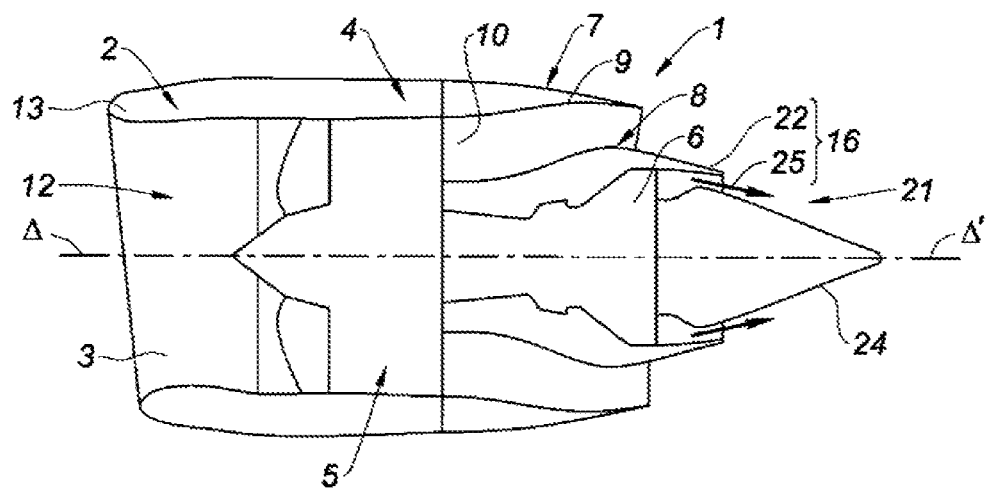
FIG. 1 is a partial diagrammatic cross-section of one form of a nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a nacelle 1 according to the present disclosure has a substantially tubular shape along a longitudinal axis Δ. The nacelle according to the present disclosure 1 comprises an upstream section 2 with an air intake lip 13 forming an air intake 3, a middle section 4 surrounding a fan 5 of a turbojet engine 6, and a downstream section 7. The downstream section 7 comprises an inner fixed structure 8 (IFS) surrounding the upstream part of the turbojet engine 6, an outer fixed structure 9 (OFS), and a moving cowl (not shown) including thrust reverser means.

The IFS 8 and the OFS 9 define an annular tunnel 10 allowing the passage of the primary flow of air 12 penetrating the nacelle 1 according to the present disclosure at the air intake 3.

The nacelle according to the present disclosure 1 therefore includes walls defining a space, such as the air intake 3 or the annular tunnel 10, in which the primary flow of air 12 penetrates, circulates and is discharged.

The nacelle 1 according to the present disclosure ends with a jet nozzle 21 comprising an outer module 22 and an inner module 24. The inner 24 and outer 22 modules define a flow channel for a flow of hot air 25 leaving the turbojet engine 6.

Each wall in contact with the hot 25 and cold 12 air flows may be formed by one or more acoustic panels.

An acoustic panel typically includes an acoustic skin pierced with a plurality of acoustic holes, a solid skin and at least one acoustic structural layer including a plurality of cells, each of which includes one or more drainage openings in one or more walls forming a cell. The acoustic structure can therefore be formed in whole or in part by a single acoustic layer made up of cells. The acoustic structure may be formed in whole or in part by a plurality of acoustic layers made up of cells that may or may not be separated by a septum.

The acoustic structural layer(s) are positioned between the acoustic skin and the solid skin.

The method according to the present disclosure makes it possible to repair such an acoustic panel.

Said method includes the steps wherein:

A—a part of the acoustic panel to be cut is defined;

B—said part is cut with the exception of the acoustic panel;

C—the cut part is removed, thereby forming a cut in the cut acoustic panel forming a cutting area that is closed by the acoustic skin;

D—a resin, which is capable of hardening at ambient temperature, is injected through the acoustic holes of the acoustic skin, said holes terminating in complete cells adjacent to junction cells belonging to the cut acoustic panel so as to block the drainage openings of said junction cells, said junction cells being intended to be in contact with the cutting area as well as the peripheral cells belonging to the replacement part of the acoustic panel;

E—a replacement cellular acoustic structure is positioned in the cutting area and on the acoustic skin, said acoustic and replacement structure having a size substantially equal to the cutting area; and F—a solid replacement skin is formed on the replacement cellular acoustic structure.

The method according to the present disclosure advantageously makes it possible to block the circulation of air during the repair of the acoustic panel between the repair area and the periphery thereof. The method therefore makes it possible simply and effectively to eliminate the pollution of the cutting area by particles in particular coming from the environment of the turbojet engine 6 and which are present in the complete cells adjacent to the cutting area. Such pollution is detrimental to the cohesion of the acoustic panel thus repaired. In fact, using the present disclosure, the drainage openings of junction cells in contact with the cutting line as well as the adjacent complete cells are obstructed. Consequently, the pollutant particles can no longer be conveyed through those openings or through the adjacent complete cells. It is as if a protective barrier against the pollutant particles of the acoustic panel is formed.

Furthermore, the present disclosure increases the mass of the repaired acoustic panel little or not at all, and damages the acoustic properties thereof little or not at all. In fact, the number of obstructed cells is negligible with respect to the total number of cells. Likewise, the sound absorption function of the acoustic panel remains substantially identical to its level before the repair.

In the present disclosure, step A, in which a part of the acoustic panel to be cut is defined, maybe done by marking on the solid skin, for example.

Said step A may be preceded by a step for cleaning the acoustic skin, in particular the visible and accessible parts such as the solid skin, using a jet of pressurized water, for example.

Step B, where said part is cut, with the exception of the acoustic skin, is done using a cutting means. Examples of cutting means include a drill provided with a disk having a diameter substantially equal to 30 mm with a diamond blade.

In step C, said cut part is removed, thereby forming the cutting area in the cut acoustic panel, said cutting area being closed at one end by the acoustic skin. Said cut part may be removed manually or automatically.

At the end of step C, a cleaning step may be performed. Said cleaning step may be done using an organic solvent associated with a lint-free means to wipe said solvent and heating in a drying apparatus. As a result, the dust particles resulting from the cutting are removed from the solid skin and part of the cells. Furthermore, the acoustic panel is advantageously degreased. The presence of grease would be detrimental to the cohesion of the panel thus repaired.

Figure 2:
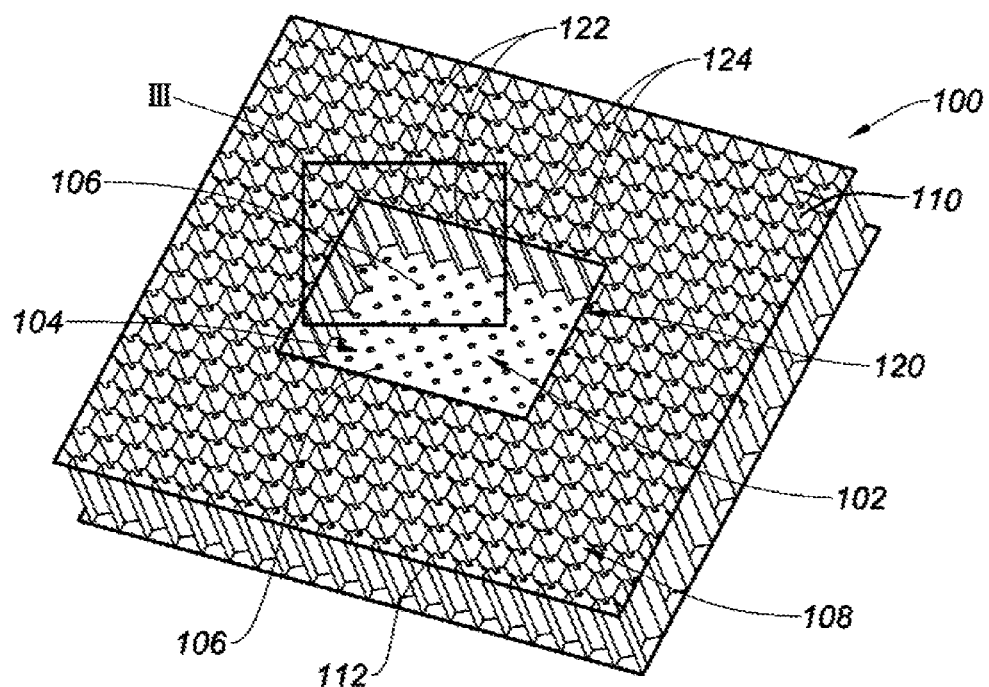
FIG. 2 is a perspective view of a cut acoustic panel according to one form of the present disclosure.

FIGS. 2 and 3 illustrate a panel 100 thus cut. Said panel 100 has a cutting area 102 covered by the acoustic skin 104. The acoustic skin 104 typically includes a plurality of acoustic holes 106, the diameter of which is comprised between 1 mm and 2 mm.

The cutting area 102 is formed by the cut part of the acoustic panel, said part being able to have any suitable shape and size.

The cellular acoustic structure 108 of the cut acoustic panel includes a plurality of cells 110. In the form of FIG. 2, the cellular acoustic structure 108 is made up of a single cellular layer, which in turn is made up of cells 110. Said cells 110 are hexagonal in the form shown in FIGS. 2 and 3. Said cells 110 may be of any other shape suitable for the present disclosure.

The cellular acoustic structure 108 is covered with a solid skin 112 shown transparently for the purposes of FIG. 3.

The acoustic 104 and solid 112 skins may be made by superimposing pre-impregnated fabricscured in an autoclave or at atmospheric pressure.

As shown in FIG. 3, during step B, it is possible to cut the part of the solid skin 112 and the cellular acoustic structure 108 to be replaced such that the cutting area 102 includes a cutting line 120 positioned at a distance $d_1$ and $d_2$ comprised between 2 mm and 3 mm from the apices 121 of the junction cells 122 closest to said cutting line 120. Thus, the cutting line 120 is more regular. This causes an injection of the resin 130 by the user that is easier for the user and managed as needed so as to avoid any excess of said resin 130.

The junction cells are in contact both with the cutting line 120 and adjacent complete cells 124. Said junction cells 122 are further designed to be in contact with the peripheral cells belonging to the replacement part at the cutting area 102.

As shown in FIGS. 4 and 5, during step D, a resin 130 capable of hardening at ambient temperature is injected through acoustic holes 106 of the acoustic skin 104, said holes 106 leading into the adjacent complete cells 124 so as to obstruct the drainage openings 132 of the junction cells 122 in contact with the adjacent cells 124.

Typically, the ambient temperature is comprised between 15° C. and 35° C.

Thus, as shown in FIG. 5, each adjacent solid cell 124 and the drainage openings 132 are filled with the resin that hardens at ambient temperature.

Consequently, it is not necessary to provide an additional polymerization cycle of the resin, which allows cost savings.

Furthermore, polymerizing the resin at ambient temperature advantageously allows the user to check visually that the drainage openings 132 are indeed obstructed before undertaking the steps to replace the cut part. Filling said drainage openings 132 makes it possible to avoid the circulation of pollutant particles toward the cutting area of the acoustic panel to be repaired.

The resin used may be chosen from among the materials making up the acoustic panel or thermoplastic materials. In the context of thermoplastic materials, the latter may be thermofusible. The use of a thermoplastic material advantageously makes it possible to be removable from the acoustic panel after the repair.

The resin may be injected using an injection means, in particular a pneumatic pistol or a syringe, which allows a simple and reliable intervention on the acoustic panel 100 everywhere that the operator has access.

Figure 6:
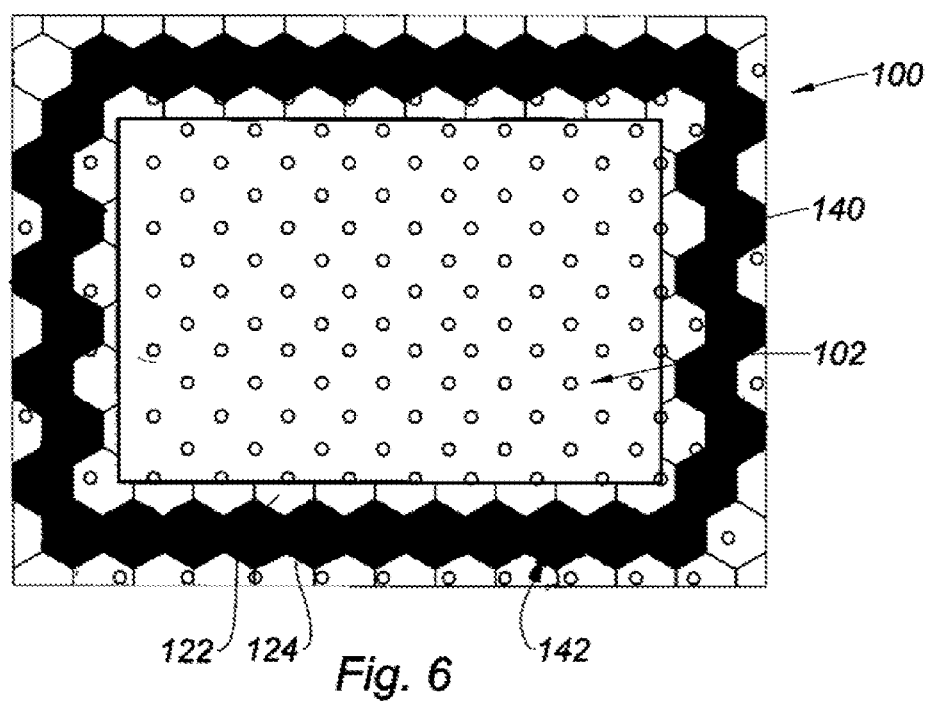
FIG. 6 is a top view of the cut acoustic panel according to one form of the present disclosure.

The injection of the resin may be done in adjacent complete cells 124 positioned in staggered rows 140 or in a line 142, as indicated in FIG. 6. The arrangement in staggered rows or in a line depends on the orientation of the adjacent complete cells 124.

In step E, a replacement cellular acoustic structure is placed on the acoustic skin 104 in the cutting area 102, said acoustic replacement structure having a size substantially equal to that of the cutting.

In step F, a solid replacement skin is formed on the replacement cellular acoustic structure.

During step F, it is possible to form the replacement solid skin by applying pre-impregnated fabrics. To that end, the cohesion of the pre-impregnated fabrics may be cured in an autoclave in which the repaired panel is positioned. According to one alternative, the cohesion of the pre-impregnated fabrics is done at atmospheric temperature.

According to one form not shown, the method according to the present disclosure may comprise an additional step G at the end of step F in which the junction cells 122 and the adjacent complete cells 124 obstructed by the resin 130 are unblocked. Thus, advantageously, the sound absorption of the acoustic panel is improved.

During step G, it is possible to unblock said cells 122 and 124 using a heating means, then a release means, in particular in the case of a resin comprising a thermoplastic material. As an example, it is possible to heat to a heating temperature comprised between 190° C. and the maximum temperature beyond which the acoustic panel is damaged. One example of a heating temperature is approximately 220° C. To expel the resin 130, thus made softer, from the cells 124, the resin 130 is removed using a removal means such as suction means. The resin 130 may also be discharged using another suitable means.

The present disclosure is not limited to the forms described and which must be interpreted non-limitingly and as encompassing all equivalent means.

What is claimed is:
1. A method for repairing at least a portion of an acoustic panel for a nacelle of an aircraft turbojet engine, said panel comprising an acoustic skin in which a plurality of acoustic holes are drilled, a solid skin, and a cellular acoustic structure comprising a plurality of cells, each of which has one or more drainage openings arranged in one or more of walls forming each cell, said acoustic structure being arranged between the acoustic skin and the solid skin, said method comprising:
- A—a part of the acoustic panel to be cut is defined;
- B—said part is cut with the exception of the acoustic skin;
- C—the cut part is removed, thereby forming a cut in the cut acoustic panel forming a cutting area that is closed by the acoustic skin;
- D—a resin, which is capable of hardening at ambient temperature, is injected through the acoustic holes of the acoustic skin, said holes terminating in complete cells adjacent to junction cells belonging to the cut acoustic panel so as to block the drainage openings of said junction cells, said junction cells being in contact with the cutting area;
- E—a replacement cellular acoustic structure is positioned in the cutting area and on the acoustic skin, said replacement cellular acoustic structure having a size substantially equal to the cutting area; and
- F—a solid replacement skin is formed on the replacement cellular acoustic structure.

2. The method according to claim 1, wherein, in step D, the resin used is chosen from among materials making up the acoustic panel or thermoplastic materials.

3. The method according to claim 1, wherein, in step D, the resin is injected using an injection means.

4. The method according to claim 3, wherein the injection means is a pneumatic pistol or a syringe.

5. The method according to claim 1, wherein during step B, the part is cut such that the cutting area is defined by a cutting line positioned at a distance comprised between 2 mm and 3 mm from the apices of each junction cell closest to the cutting line.

6. The method according to claim 1, further comprising an additional step G at the end of step F wherein the adjacent complete cells obstructed by the resin are unblocked.

7. The method according to claim 6, wherein during the step G, said cells are unblocked using heating, then a release means.

8. The method according to claim 1, wherein, during step F, the solid replacement skin is formed by applying pre-impregnated fabrics.

9. The method according to claim 1, wherein the cellular acoustic structure includes one or more substantially superimposed cellular layers that are separated by a septum.

10. An acoustic panel prepared using the repair method according to claim 1.

* * * * *